(12) United States Patent
Bobak et al.

(10) Patent No.: US 10,370,115 B2
(45) Date of Patent: Aug. 6, 2019

(54) RELEASE MECHANISM

(71) Applicant: Hamilton Sundstrand Corporation, Charlotte, NC (US)

(72) Inventors: Jakub Mateusz Bobak, Legnica (PL); Przemyslaw Kiełczykowski, Wrocław (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/869,132

(22) Filed: Jan. 12, 2018

(65) Prior Publication Data
US 2018/0201389 A1 Jul. 19, 2018

(30) Foreign Application Priority Data
Jan. 14, 2017 (EP) ..................... 17461504

(51) Int. Cl.
*B64D 41/00* (2006.01)
*F16H 21/16* (2006.01)
(Continued)

(52) U.S. Cl.
CPC ........... *B64D 41/007* (2013.01); *F16H 21/26* (2013.01); *F03D 9/32* (2016.05); *F05B 2240/923* (2013.01); *F05D 2220/34* (2013.01); *F16H 21/44* (2013.01)

(58) Field of Classification Search
CPC ....... B64D 41/007; F16H 21/06; F16H 21/26; F16H 21/44; F03D 9/32; F05B 2240/923; F05D 2220/34; B29C 45/681; F02C 7/32
See application file for complete search history.

(56) References Cited

U.S. PATENT DOCUMENTS 2,694,935 A 11/1954 Roehri
3,278,195 A 10/1966 Joseph
(Continued)

FOREIGN PATENT DOCUMENTS

EP 3023677 A1 5/2016
FR 2651527 A1 3/1991
(Continued)

OTHER PUBLICATIONS

Extended European Search Report for International Application No. 17461504.7 dated Jul. 17, 2017, 10 pages.

*Primary Examiner* — Adam D Rogers
(74) *Attorney, Agent, or Firm* — Cantor Colburn LLP

(57) ABSTRACT

A toggle release mechanism includes a base element, a toggle element and an actuating rod. The toggle element is rotatably mounted at a first end to the base element about a first axis for rotation between a locking position and a release position. The actuating rod has a central portion extending through the toggle element and first and second end portions projecting on opposed sides thereof for engagement with actuators arranged on opposed sides of the release mechanism. The actuating rod also includes a mounting flange projecting therefrom at a boundary between the central portion and a first end portion. The mounting flange has a first hole therein for receiving a first fastener. A surface of the toggle element facing the mounting flange has a bore formed therein for receiving the first fastener. The mechanism also includes a mounting element slidably received on the second end of the rod.

18 Claims, 5 Drawing Sheets

(51) Int. Cl.
*F16H 21/26* (2006.01)
*F16H 21/44* (2006.01)
*F03D 9/32* (2016.01)

(56) References Cited

U.S. PATENT DOCUMENTS

| | | | | |
|---|---|---|---|---|
| 3,440,933 | A * | 4/1969 | Sutton | B23H 7/26 |
| | | | | 74/104 |
| 9,365,295 | B2 * | 6/2016 | Sasscer | B64D 41/007 |
| 9,821,919 | B2 * | 11/2017 | Bortoli | B64D 41/007 |
| 9,976,636 | B2 * | 5/2018 | Prokup | F16H 21/06 |
| 2002/0163201 | A1 | 11/2002 | Schlack et al. | |
| 2009/0283634 | A1 | 11/2009 | Tran | |
| 2013/0327207 | A1 | 12/2013 | Sasscer et al. | |
| 2013/0327885 | A1 | 12/2013 | Sasscer | |
| 2013/0330121 | A1 | 12/2013 | Sasscer et al. | |
| 2016/0288919 | A1 | 10/2016 | Sasscer et al. | |
| 2016/0312865 | A1 | 10/2016 | Prokup et al. | |
| 2017/0204950 | A1 * | 7/2017 | Sobolak | B64D 41/007 |
| 2017/0259934 | A1 * | 9/2017 | Bortoli | B64D 41/007 |
| 2017/0260906 | A1 * | 9/2017 | Bortoli | B64D 41/007 |
| 2018/0050814 | A1 * | 2/2018 | Pawalec | F03D 9/32 |

FOREIGN PATENT DOCUMENTS

| | | |
|---|---|---|
| GB | 650016 A | 2/1951 |
| WO | 8603725 A1 | 7/1986 |
| WO | 2013172804 A1 | 11/2013 |

* cited by examiner

RELEASE MECHANISM

FOREIGN PRIORITY

This application claims priority to European Patent Application No. 17461504.7 filed Jan. 14, 2017, the entire contents of which is incorporated herein by reference.

TECHNICAL FIELD

The present disclosure relates to release mechanisms, in particular but not exclusively, to release mechanisms for Ram Air Turbines (RATs).

BACKGROUND

Ram Air Turbines (RATs) are used in aircraft to provide electric and/or hydraulic power to components of the aircraft, for example in the event of failure of other electrical or hydraulic power generating equipment on board the aircraft. In normal operation of the aircraft, the RAT is housed within the aircraft, but when needed it is extended into the airflow around the aircraft such that it may turn and generate electrical and/or hydraulic power. The RAT is typically pivoted into position by means of an actuator, for example a hydraulic actuator. The actuator typically includes a piston which extends to deploy the RAT. The actuator has a locking mechanism which prevents inadvertent movement of the piston and thus inadvertent deployment of the RAT. The locking mechanism typically comprises a spring loaded locking piston which must be moved in an axial direction to release the actuator. Such a mechanism is disclosed for example in US 2013/0327207 A1.

A release mechanism is provided to permit this movement. Typically, the release mechanism comprises a toggle type linkage, one end of which is coupled to one end of the locking piston and the other end of which is axially fixed and rotatably coupled to a support. A pair of linear solenoid actuators is coupled to the linkage and operable to move the linkage over centre between a locked and an unlocked position. The actuators are coupled to the linkage via an actuator rod which projects on both sides from the linkage. Two actuators are provided for fail safe operation.

It is desirable to mount the actuating rod in such a manner that the actuating forces on both sides of the linkage so as to provide consistent operation of the mechanism.

SUMMARY

Disclosed herein is a toggle release mechanism comprising a base element, a toggle element and an actuator rod. The toggle element is rotatably mounted at a first end to the base element about a first axis for rotation between a first, locking position and a second, release position. The actuating rod has a central portion extending through the toggle element and first and second end portions projecting on opposed sides thereof for engagement with actuators arranged on opposed sides of the release mechanism. The actuating rod further comprises a mounting flange projecting therefrom at a boundary between the central portion and the first end portion of the actuator rod. The mounting flange has a first hole therein for receiving a first fastener. A surface of the toggle element facing the mounting flange has a bore formed therein for receiving the first fastener. The mechanism further comprises a mounting element slidably received on the second end of the actuating rod. The mounting element has a bore for receiving the second end of the actuator rod and a second hole for receiving a second fastener. A surface of the toggle element facing the mounting element has a second bore formed therein for receiving the second fastener.

In embodiments of the disclosure, the mounting element may be a plate like element.

The mounting element plate may have has a thickness substantially the same as the thickness of the mounting flange.

The mounting element may also, or alternatively have a shape generally similar to that of the mounting flange, for example a generally triangular shape.

The first and second holes in the mounting flange and mounting element and the first and second bores in the toggle element may be aligned along a common axis. The common axis may be parallel to and optionally vertically aligned with the first axis.

The toggle element may be generally rhomboidal in shape, and the first and second bores may be arranged at an apex of the rhombus.

The mounting element may be a close fit on the second end of the actuating rod.

The mechanism may further comprise a return spring mechanism provided between the base element and the toggle element for rotating the toggle element in a direction towards the locking position.

The return spring mechanism may comprise first and second springs mounted between the base element and the toggle element.

The first and second springs may be torsion springs mounted between the toggle element and the base element. The first and second torsion springs may be wound in opposite directions.

The first and second springs may be symmetrically arranged relative to a centre line of the mechanism.

Each torsion spring may comprise a first leg extending therefrom at one end for engaging a receiving surface on the toggle element and a second leg extending therefrom at the other end thereof for engaging the base element. The respective first legs may be arranged closer together than the respective second legs.

The first and second legs may extend parallel to each other in vertically offset planes in the locked position of the mechanism.

The mechanism may further comprise a link element mounted at a first end to a second end of the toggle element about a second axis parallel to the first axis.

The disclosure also provides a ram air turbine actuation mechanism comprising a spring biased locking piston movable between a first position in which the ram air turbine is held in a retracted position and a second position which releases the ram air turbine. The ram air turbine actuation mechanism further comprises a toggle release mechanism in accordance with the disclosure. The locking piston is coupled to the link element of the toggle release mechanism to apply a force thereto in a direction towards said base element of the toggle release mechanism.

The toggle release mechanism may further comprise a coupling element mounted to a second end of the link element about a third axis parallel to the first and second axes. The locking piston may abut the coupling element. The coupling element may comprises a stem received within a bore of the locking piston.

BRIEF DESCRIPTION OF DRAWINGS

An embodiment of the disclosure will now be described by way of example only, with reference to the accompanying drawings in which.

DETAILED DESCRIPTION

Figure 1:
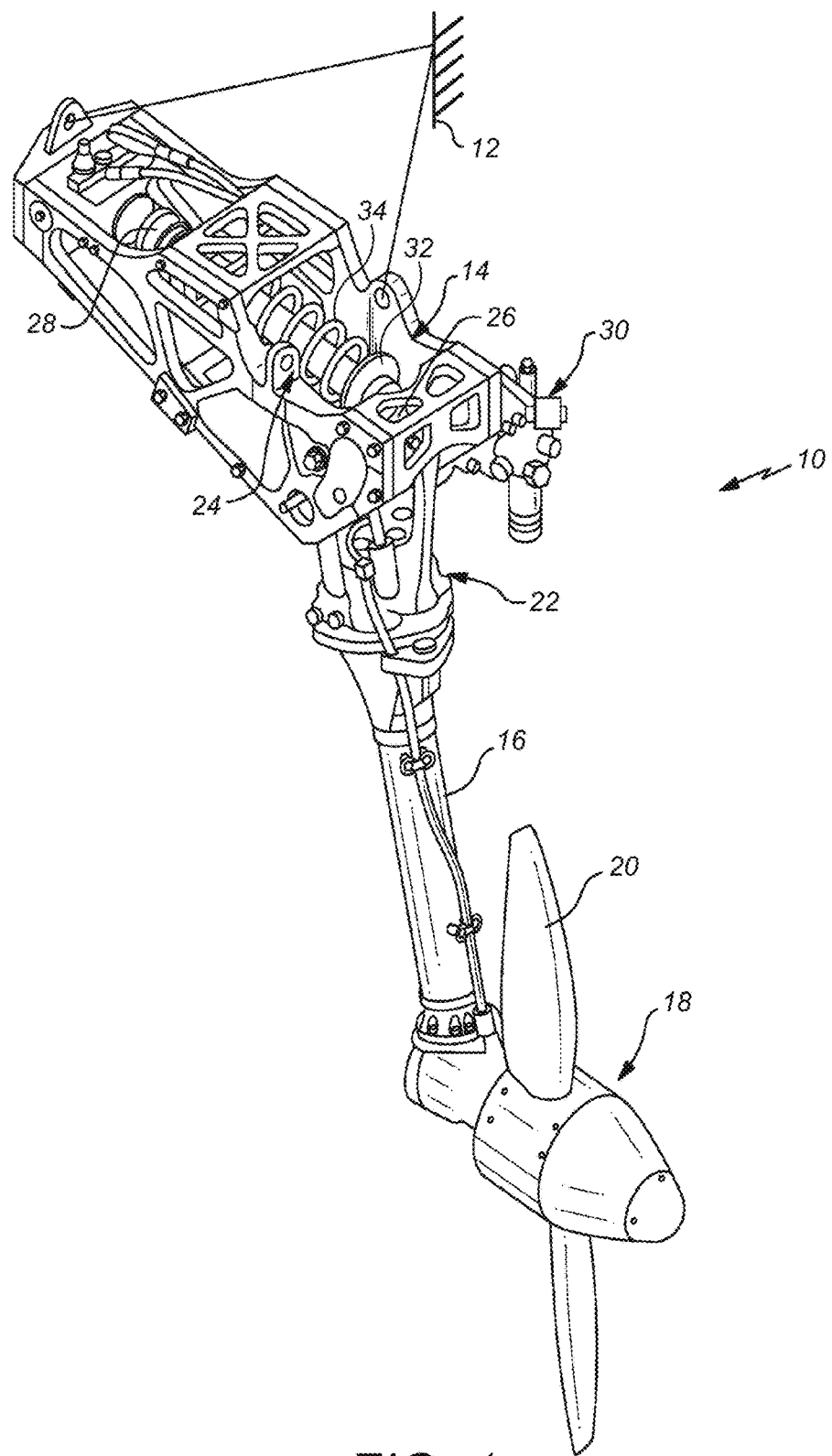
FIG. 1 shows a ram air turbine.

FIG. 1 illustrates an exemplary RAT system 10 which is secured to an aircraft structure 12 by a housing 14. The housing 14 pivotally supports a strut 16 having a turbine 18 at one end. The turbine 18 includes blades 20, which impart rotational drive to a generator 22 and hydraulic pump 30 for example. An actuator 24 is secured to the strut at a first end 26 and to the housing at a second end 28. The actuator 24 is illustrated in its deployed position.

The actuator 24 comprises a cylinder 32 which is biased by a spring 34 in order to deploy the strut 16. When the cylinder 32 is retracted, it is held in its retracted position by means of a locking mechanism 36, details of which will be described with reference to FIG. 2.

Figure 2:
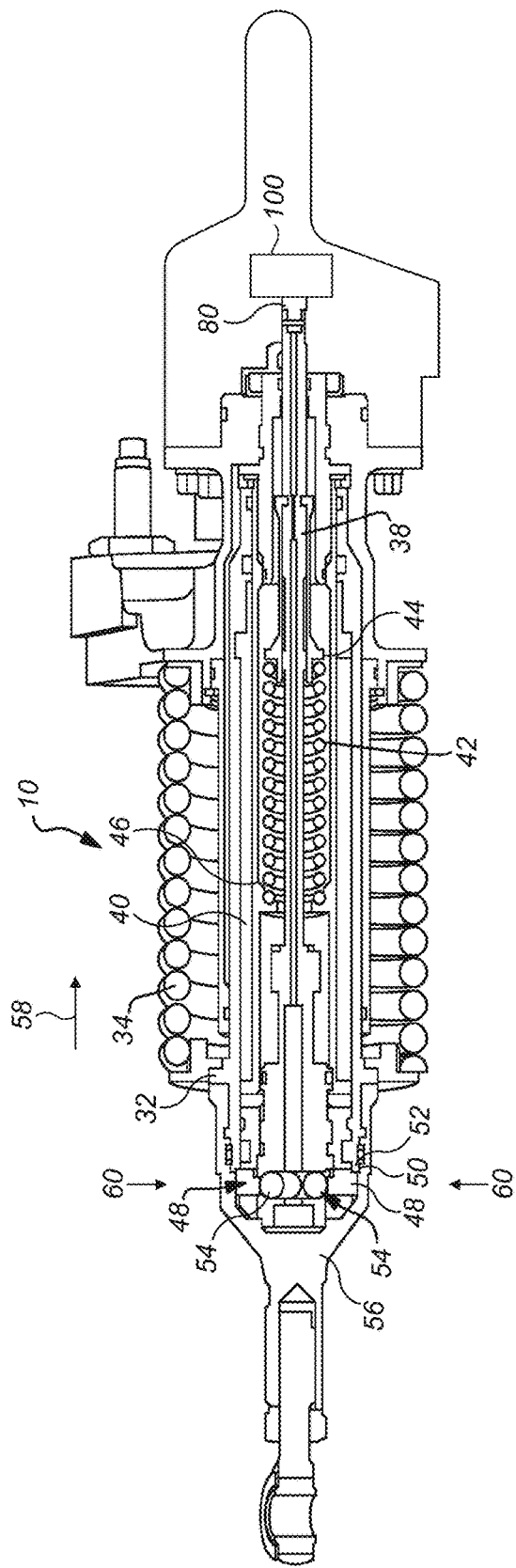
FIG. 2 shows, some detail of the ram air turbine of FIG. 1.

With reference to FIG. 2, the locking mechanism 36 comprises a locking piston or bolt 38 which is received slidably within a sleeve 40. The locking piston 38 is biased to the right in the sense of FIG. 2 by means of a biasing spring 42 which extends between a seat 44 provided on the locking piston 38 and a seat 46 provided on the sleeve 40.

The extensible cylinder 32 of the actuator is slidably mounted around the sleeve 40. Extension of the cylinder 32 is prevented by locking elements 48 mounted at the end of the sleeve. In the locking position, respective shoulders 50, 52 of the cylinder 32 and locking wedges 48 engage to prevent axial movement of the cylinder 32.

A number of rollers 54 are mounted in the distal end 56 of the locking piston 38. However, it will be noted that when the locking piston 38 is moved to the right in a direction of arrow 58 under the force of the biasing spring 42, the wedges 48 may displace in the direction of arrows 60 thereby disengaging the shoulders 50, 52 and allowing the cylinder 32 to extend to deploy the RAT. This general type of locking mechanism is known in the art and is discussed in some detail, for example in US 2013/0330121 A1 and US2013/0327885 A1.

To unlock the locking mechanism, the distal end 80 of the locking piston 38 is attached to a toggle release mechanism 100 illustrated only schematically in FIG. 2. In essence, as will be described further below, the release mechanism 100 is movable between a locking position in which it retains the locking piston 38 in the position shown in FIG. 2 and a release position in which it permits the locking piston 38 to move to the right under the force of the spring 42, move the rollers 54 of the locking piston 38 out of alignment with the locking surfaces of the locking wedges 48, thereby allowing deployment of the actuator cylinder 32.

A toggle release mechanism in accordance with an embodiment of the disclosure will now be described with reference to FIGS. 3 to 5.

Figure 3:
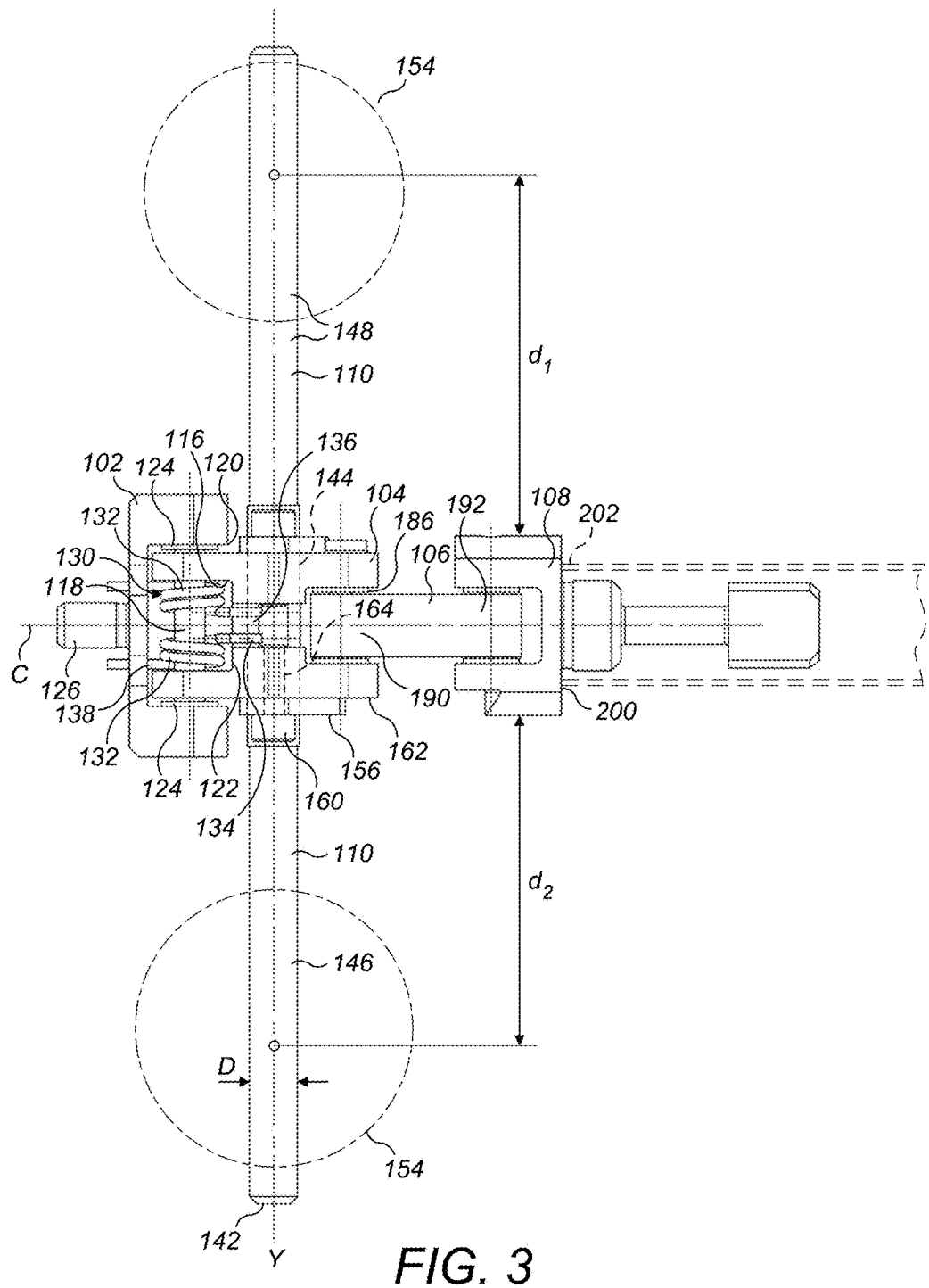
FIG. 3 shows, schematically, a plan view of a toggle release mechanism and locking piston of a ram air turbine locking mechanism.
Figure 4:
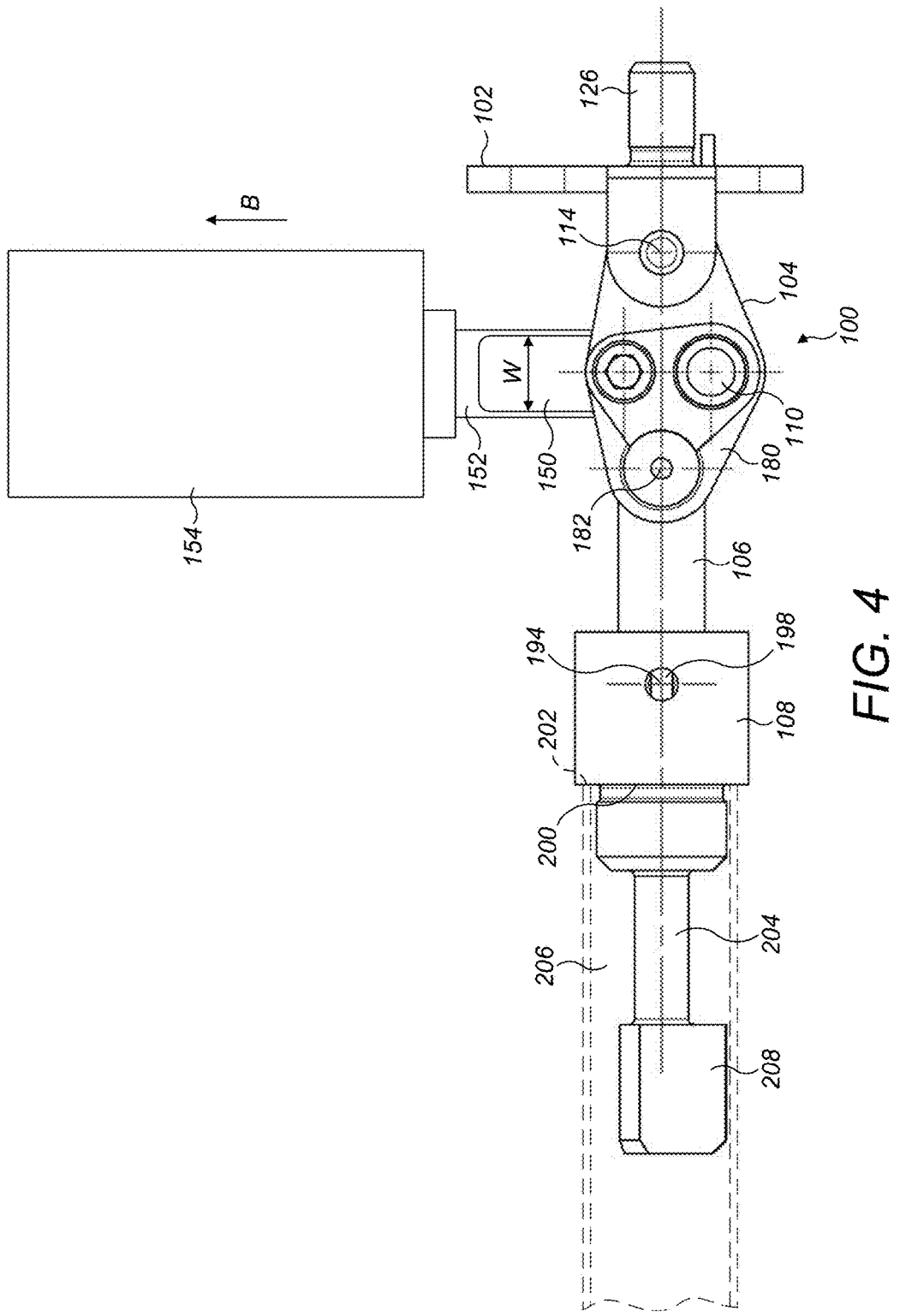
FIG. 4 shows a top view the toggle release mechanism of FIG. 3.

As illustrated in FIGS. 3 and 4, the toggle release mechanism 100 may be coupled to the locking piston 38 of the ram air turbine discussed above. However, it will be appreciated that the toggle release mechanism 100 may be used in many other applications.

The toggle release mechanism 100 comprises a base element 102, a toggle element 104, a link element 106, a coupling element 108 and an actuating element 110.

The toggle element 104 is pivotally coupled at a first end 112 to the base element 102 about a first axis 114. The toggle element 104 in this embodiment is generally rhomboidal in shape, although other shapes of toggle element 104 are within the scope of this disclosure.

The first end 112 of the toggle element 102 is formed with a clevis 116 which receives a clevis pin 118 about which the toggle element 104 pivots. The clevis pin 118 is retained in a clevis 120 formed on the base element 102 and projecting towards the toggle element 104 from a base portion 122. Washers 124 are arranged at respective ends of the clevis pin 118.

A mounting element 126 projects from the base element 102 in the direction away from the toggle element 104. The mounting element 126 is used to locate the toggle release mechanism 100, for example in a housing, for example in the RAT actuator housing as will be described further below.

In this embodiment, the mounting element 126 is generally co-planar with and perpendicular to the first axis 114. The mounting element 126 is in this embodiment formed as a pin with a cylindrical shape, allowing the mounting element 126 to be inserted in a complementary bore in the housing and rotated about the axis of the element to allow accurate alignment of the base element 102 in the housing. Advantageously, the mounting element 126 will be a tight fit with the bore to provide accurate positioning of the base element 102. The base element 102 may be fastened to the housing by fasteners (not shown) which may extend through mounting bores 128 provided in the base portion 122 of the base element 102.

A return spring mechanism 130 is provided between the base element 102 and the toggle element 104. In this embodiment, the return spring mechanism 130 comprises a pair of torsion springs 132 mounted around the clevis pin 118. The springs are coiled in opposite directions. Each spring 132 has a first spring end 134 engaging a surface 136 at the base of the toggle clevis 112 and a second spring end 138 which is received in a respective bore 140 in the base element 102.

It will be noted that the first and second springs 132 are arranged symmetrically relative to the central axis C of the mechanism 100. This may be advantageous in balancing the spring loads applied to the toggle element 104.

Figure 5:
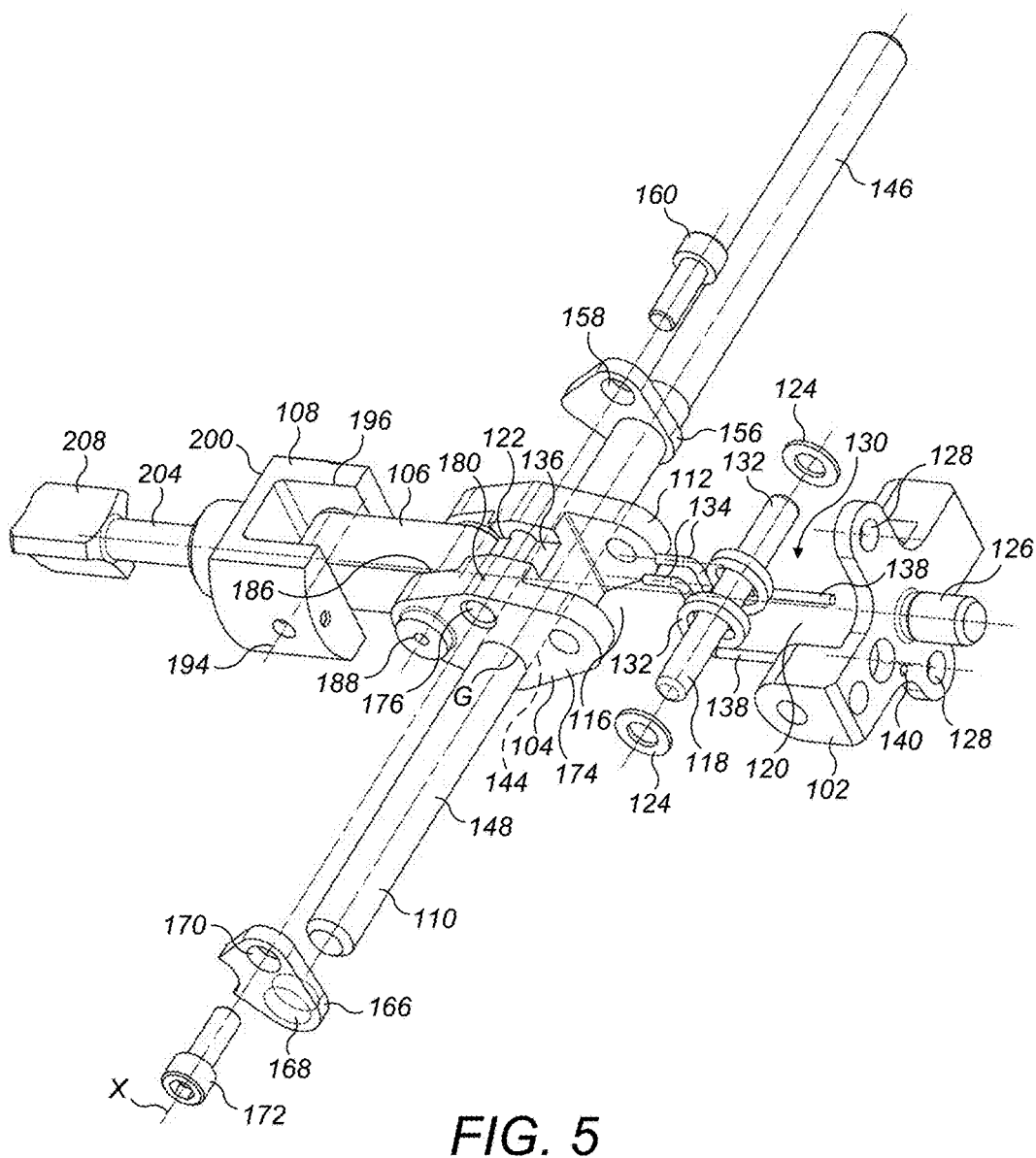
FIG. 5 shows a partially exploded perspective view of the toggle release mechanism of FIG. 3.

As will be seen from FIG. 5, the first and second spring ends 134, 138 are arranged to extend generally parallel to one another in vertically offset planes in the unlocked position. In this embodiment, the first spring ends 134 are above the second spring ends 138, although the positions may, for example, be reversed. It will also be noted that the respective first spring ends 134 are arranged closer together than the second spring ends 138.

It will be appreciated that other return spring mechanisms may be provided, for example a single torsion spring.

As discussed briefly above, the toggle element 104 receives the actuating element 110. In this embodiment, the actuating element 110 is a rod 142 which has a central portion 144 received in a through bore 145 of the toggle element 104 and first and second end portions 146, 148 projecting from respective sides of the toggle element 104.

The first and second end portions 146, 148 are received within respective slots 150 of plungers 152 of respective linear solenoid actuators 154, illustrated schematically in FIGS. 3 and 4. Other linear actuators may be used within the scope of the disclosure. Two actuators 154 are provided to provide for redundancy and failsafe operation, movement of one actuator 154 being sufficient to operate the toggle mechanism 100.

The slot 150 has a width W which is greater than the diameter D of the actuator rod 142 so as to allow some movement of the rod 142 within the slot in the axial direction. The solenoid actuator 154 produces an actuating movement transverse to the axis C as illustrated in FIG. 4 by arrow B.

The actuator rod 142 is mounted to the toggle element 104 by means of a mounting flange 156 formed at the boundary between the central portion 144 and the first end portion 146 of the actuating rod 142. The mounting flange 156 is, in this embodiment, a generally triangular plate-like element, although other shapes may be employed.

The mounting flange 156 is, in this embodiment, integrally formed with the actuating rod 142.

The mounting flange 156 is provided with a first opening 158 therethrough to receive a first fastener 160, for example a threaded fastener 160 as shown. The surface 162 of the toggle element 104 facing the mounting flange 156 is provided with a first bore 164, e.g. a threaded bore, for receiving the first fastener 160. When received in the first bore 164 and tightened, the first fastener 160 will securely mount the actuator rod 142 to the toggle element 104.

It will be appreciated that in order to allow the passage of the actuator rod 142 through the bore 145 of the toggle element 104, a certain clearance must be provided between the actuator rod 142 and the bore 145. This means that there will be a small radial gap G formed between the second end portion 148 of the actuator rod 142. It has been recognised that even a small gap G may lead to a different strokes of the solenoids 154 on opposite sides of the toggle element 104 being required to trigger the toggle mechanism 100. In extreme conditions, this may mean that one of the actuators 154 may not provide sufficient movement to trigger the mechanism 100. Moreover, the point of action of the actuator force on either side of the toggle element 104 is not symmetrical as the actuator force on the second end 148 actuator rod 142 is also effectively applied through the mounting flange 156. The actuator rod 142 may also deflect due to the gap G before the actuating force is transmitted to the toggle element 104.

In order to mitigate these possible effects, a further mounting element 166 provided. The mounting element 166 is slidably received over the second end portion 148 of the actuating rod 142. The mounting element 166 has a bore 168 for receiving the actuating rod 142 and a second hole 170 for receiving a second fastener 172, for example a threaded fastener 172. The surface 174 of the toggle element 104 facing the mounting element 166 is provided with a second bore 176, for example a threaded bore 176 to receive the second fastener 172.

As can be seen from FIGS. 3 and 5, the first and second bores 164, 176 of the toggle element 104 are aligned along a common axis X. The common axis X is parallel to and directly above the axis Y of the actuator rod 142. The bores 164, 176 are arranged at an apex 180 of the toggle element 104 so as to minimise interference with other elements of the mechanism 100.

The mounting element 166 is, in this embodiment, in the form of a generally triangular plate having a shape and a thickness generally similar to that of the mounting flange 156 of the actuator rod 142.

The second end portion 148 of the actuating rod 142 is received with a close fit within the bore 168 of the mounting element 166 such that there is a smaller clearance (if any clearance at all) formed between the actuating rod 142 and the mounting element 166 than between the actuating rod 142 and the toggle element bore 145.

This arrangement may provide a number of benefits compared to arrangements with just a mounting flange 156.

Firstly, the second end 148 of the actuator arm 142 is now located much more accurately relative to the toggle element 104, meaning that the engagement of the actuator slot 150 with the actuator end portions 146, 148 can be more accurately set, thereby reducing or eliminating differences in actuator stroke length needed to trigger the mechanism 100.

Moreover, the actuator force acting on the second end portion of the actuator rod is transmitted into the toggle element 104 from the actuators 154 through the mounting plate 166 rather than mounting flange 156. Thus actuating forces are applied in a more symmetrical manner on opposed sides of the toggle element 104. This is illustrated in FIG. 3, which illustrates the distances d1 and d2 between the outwardly facing surfaces of the mounting flange 156 and mounting element 166, and the point of application of force from the respective actuators 154. In the arrangement illustrated, the distances d1 and d2 are the same, meaning that the forces transmitted into the toggle element 104 will be the same (assuming the individual actuator forces are the same). The use of the mounting element 166 therefore leads to more reliable and consistent operation of the mechanism. There is potentially also no need to oversize the actuators 154 to account for unequal operating forces on the actuator rod, allowing a potentially more compact installation.

Turning briefly to the other elements of the mechanism 100, the link element 106 is pivotally connected to a second end 180 of the toggle element 104 about a second pivot axis 182 which is parallel to the first axis 114. The second end 180 of the toggle element 104 is also formed with a clevis 186, receiving a clevis pin 188 which extends through a first end 190 of the link element 106 and forms the second pivot axis 182.

A second end 192 of the link element 106 is pivotally connected to the coupling element 108 about a third pivot axis 194 which is parallel to the first and second axes 114, 182. The coupling element 108 is formed with a clevis 196 which receives a clevis pin 198 which extends through the second end of the link element 106 and forms the third pivot axis 194.

The coupling element 108 is formed with an end surface 200 which abuts the end surface 202 of the locking piston 38. In this embodiment, the coupling element 108 further comprises a stem 204 which is received within a bore 206 formed in the adjacent end of the locking piston 38. Three or more fins 208 projecting from the stem 204 assist in locating the coupling element 108 within the bore 206. The fins 208 are typically equispaced around the circumference of the stem 204. The stem 204 may be easily removable from the bore 206. This may facilitate location of the coupling element 108. The coupling element 108 is constrained to move in an axial direction along axis A which passes through the first pivot axis 114 by virtue of its mounting to the locking piston 38, since the locking piston 38 is slidably mounted (by suitable means not shown) for movement along the axis C.

The operation of the toggle release mechanism 100 will now be described.

The base element 102 is mounted to a support surface in the actuating mechanism or other mechanism to be released. As discussed above, this may be effected through the mounting element 126. In the context of the RAT actuator disclosed in FIGS. 1 and 2, the base element may be suitably mounted in a head region 200 of the actuator.

The coupling element 108 is then coupled to the locking element of the mechanism, be released. In the RAT embodiment of FIGS. 1 and 2, the coupling element 108 is coupled to the end of the locking piston 38 by virtue of the stem 202 of the coupling element 108 being received within the bore 204 of the locking piston 38, the opposed surfaces 200, 202 of the coupling element 108 and the locking piston 38 abutting.

The biasing spring 42 of the RAT locking mechanism exerts a force F in the axial direction A. The toggle release mechanism 100 will hold the locking piston 38 when it is in the locking position shown in the Figures.

When it is desired to unlock the RAT actuator, the solenoid actuators 154 are operated, pulling the actuating rod 142 upwardly in the sense of the Figures against the biasing force of the torsion springs 132. This will rotate the toggle element 104 clockwise about the first axis 114.

As discussed above, the provision of the mounting element 166 equalises the forces acting on the toggle element 104, leading to a more consistent and repeatable operation.

When the second axis 182 moves above the line joining the first and third pivot axes 114, 194, the force of the spring 42 (which will be significantly greater than that of the return spring 134) will continue the clockwise rotation which, through the link element 106, will allow the coupling element 108 and the locking piston 38 to move to the right in the sense of the Figures. The width W of the slot 150 in the actuator plunger 152 will allow some axial movement of the actuating rod 142 caused by the rotation of the toggle element 104. The movement of the locking piston 38 will the rollers 54 of the locking piston 38 out of alignment with the locking surfaces of the locking wedges 48, thereby allowing deployment of the actuator cylinder 32.

The biasing force of the actuator biasing spring 42 will maintain the toggle element 104 in this position, and the solenoid actuators 154 may be de-energised. Typically, a spring provided within the solenoid actuator 154 may move the solenoid back it into its initial position.

When it is desired to stow the RAT once more, hydraulic pressure is applied to the actuator in order to move the locking piston 38 in the opposite direction to the direction indicated by arrow 58 in FIG. 2. The toggle element 104 is then able to rotate clockwise about the first axis under the action of the return springs 132, which has been pre-loaded by the movement of the toggle element 104 to its release position. The actuating rod 142 is able to move freely in the slot 150, allowing the toggle element 104 to rotate back to the locking position. The hydraulic pressure on the actuator may then be removed so as to release the locking piston 38 which, by virtue of the biasing spring 42 will once more to act on the coupling element 108 which has by now returned to its original position.

It will be understood that the terms "above" and "below" as used herein are relative terms and do not imply any particular orientation of the mechanism in use. In effect, they merely represent opposite sides of a longitudinal axis extending through the first axis 114.

It will also be understood that the above is a description of just one possible embodiment of the disclosure and that modifications may be made thereto without departing from the scope thereof.

The invention claimed is:

1. A toggle release mechanism comprising:
a base element;
a toggle element rotatably mounted at a first end to the base element about a first axis for rotation between a locking position and a release position; and
an actuating rod having a central portion extending through the toggle element and first and second end portions projecting on opposed sides thereof for engagement with actuators arranged on opposed sides of the release mechanism;
wherein the actuating rod comprises a mounting flange projecting therefrom at a boundary between the central portion and the first end portion and mounting the actuating rod to the toggle element, the mounting flange having a first hole therein for receiving a first fastener;
wherein a surface of the toggle element facing the mounting flange has a bore formed therein for receiving the first fastener to secure the actuating rod to the toggle element;
and further comprising:
a mounting element slidably received on the second end portion of the actuating rod, the mounting element having a bore for receiving the second end portion of the actuator rod and a second hole for receiving a second fastener; and
a surface of the toggle element facing the mounting element having a second bore formed therein for receiving the second fastener.

2. A toggle release mechanism as claimed in claim 1, wherein the mounting element is a plate element.

3. A toggle release mechanism as claimed in claim 2, wherein the mounting element has a thickness the same as a thickness of the mounting flange.

4. A toggle release mechanism as claimed in claim 1, wherein the first holes in the mounting flange and the second hole in the mounting element and the first and second bores in the toggle element are aligned along a common axis (X).

5. A toggle release mechanism as claimed in claim 4, wherein the common axis (X) is parallel to and vertically aligned with the first axis.

6. A toggle release mechanism as claimed in claim 1, wherein the toggle element is rhomboidal in shape and the first and second bores are arranged at an apex of the rhombus.

7. A toggle release mechanism as claimed in claim 1, further comprising a return spring mechanism provided between the base element and the toggle element for rotating the toggle element in a direction towards the locking position.

8. A toggle release mechanism as claimed in claim 7, wherein the return spring mechanism comprises a first spring and a second springs mounted between the base element and the toggle element.

9. A toggle release mechanism as claimed in claim 8, wherein said first and second springs are torsion springs mounted between the toggle element and the base element.

10. A toggle release mechanism as claimed in claim 9, wherein each torsion spring comprises a first leg extending therefrom at one end for engaging a receiving surface on the toggle element and a second leg extending therefrom at another end thereof for engaging the base element.

11. A toggle release mechanism as claimed in claim 10, wherein, the respective first legs are arranged closer together than the respective second legs.

12. A toggle release mechanism as claimed in claim 9, wherein the first and second torsion springs are wound in opposite directions.

13. A toggle release mechanism as claimed in claim 8, wherein the first and second springs are arranged symmetrically about a central axis (C) of the toggle element.

14. A toggle release mechanism as claimed in claim 10 wherein the first and second legs extend parallel to each other in vertically offset planes in the locking position of the toggle element.

15. A toggle release mechanism as claimed in claim 1, further comprising a link element mounted at a first end to a second end of the toggle element about a second axis parallel to the first axis.

16. A ram air turbine actuation mechanism comprising:
   a spring biased locking piston movable between a first position in which a ram air turbine is held in a retracted position and a second position which releases the ram air turbine; and
   a toggle release mechanism comprising:
   a base element;
   a toggle element rotatably mounted at a first end to the base element about a first axis for rotation between a locking position and a release position; and
   an actuating rod having a central portion extending through the toggle element and first and second end portions projecting on opposed sides thereof for engagement with actuators arranged on opposed sides of the toggle release mechanism;
   wherein the actuating rod comprises a mounting flange projecting therefrom at a boundary between the central portion and the first end portion, the mounting flange having a first hole therein for receiving a first fastener;
   wherein a surface of the toggle element facing the mounting flange has a bore formed therein for receiving the first fastener; and further comprising:
   a mounting element slidably received on the second end portion of the actuating rod, the mounting element having a bore for receiving the second end portion of the actuator rod and a second hole for receiving a second fastener; and
   a surface of the toggle element facing the mounting element having a second bore formed therein for receiving the second fastener;
   said locking piston being coupled to a link element of the toggle release mechanism to apply a force thereto in a direction towards said base element of the toggle release mechanism.

17. The ram air turbine actuation mechanism of claim 16, wherein:
   the toggle release mechanism further comprises a link element mounted at a first end to a second end of the toggle element about a second axis parallel to the first axis and a coupling element mounted to a second end of the link element about a third axis parallel to the first and second axes; and
   the locking piston abuts the coupling element, and
   the coupling element further includes a stem received within a bore of the locking piston.

18. The ram air turbine actuation mechanism of claim 16, wherein:
   the toggle release mechanism further comprises a link element mounted at a first end to a second end of the toggle element about a second axis parallel to the first axis and a coupling element mounted to a second end of the link element about a third axis parallel to the first and second axes; and
   the locking piston abuts the coupling element.

* * * * *